United States Patent
Ganzel (10) Patent No.: US 12,403,879 B2
(45) Date of Patent: Sep. 2, 2025

(54) POWER TRANSMISSION UNIT AND BRAKE SYSTEMS USING SAME

(71) Applicant: ZF Active Safety US Inc., Livonia, MI (US)

(72) Inventor: Blaise J. Ganzel, Ann Arbor, MI (US)

(73) Assignee: ZF ACTIVE SAFETY US INC., Livonia, MI (US)

(*) Notice: Subject to any disclaimer, the term of this patent is extended or adjusted under 35 U.S.C. 154(b) by 945 days.

(21) Appl. No.: 17/400,326

(22) Filed: Aug. 12, 2021

(65) Prior Publication Data

US 2023/0048069 A1    Feb. 16, 2023

(51) Int. Cl.
   *B60T 8/40* (2006.01)
   *B60T 7/08* (2006.01)
   (Continued)

(52) U.S. Cl.
   CPC ............ B60T 13/745 (2013.01); B60T 7/085 (2013.01); B60T 13/148 (2013.01);
   (Continued)

(58) Field of Classification Search
   CPC .... B60T 13/745; B60T 13/148; B60T 15/028; B60T 2220/04; B60T 2270/40; B60T 2270/82; B60T 7/085; B60T 13/686; B60T 17/221; B60T 2270/402; B60T 2270/404; B60T 2270/88
   See application file for complete search history.

(56) References Cited

U.S. PATENT DOCUMENTS

| | | | |
|---|---|---|---|
| 10,150,458 B2* | 12/2018 | Weh | F04B 17/03 |
| 2002/0079420 A1* | 6/2002 | Arnold | H02K 5/24 |
| | | | 248/672 |

(Continued)

FOREIGN PATENT DOCUMENTS

| | | |
|---|---|---|
| DE | 102019005982 A1 | 2/2020 |
| DE | 102018009370 A1 | 6/2020 |
| DE | 102022206557 A1 | 1/2023 |
| WO | 2019/195542 A1 | 10/2019 |

OTHER PUBLICATIONS

German Search Report for corresponding German Application Serial No. 10 2022 208 247.8, dated Mar. 30, 2023, pp. 1-14.

*Primary Examiner* — Nicholas J Lane
(74) *Attorney, Agent, or Firm* — Tarolli, Sundheim, Covell & Tummino LLP (57) ABSTRACT

A power transmission unit of a single-acting plunger type includes a ball screw, a ball nut driven by the ball screw, and a plunger piston coupled to the ball nut. A block housing at least partially encloses the plunger piston and the ball screw. A plunger chamber is at least partially defined by the block housing and a face of the plunger piston. The plunger chamber is selectively pressurized by reciprocal motion of the plunger piston with respect to the block housing driven by longitudinal motion of the ball nut. An electric motor selectively drives the ball screw to responsively reciprocate the plunger piston within the plunger chamber. A motor housing at least partially encloses the ball nut, the electric motor, and the plunger piston. The motor housing includes a block lip which is crimped to the block housing to maintain the motor housing in relation to the block housing.

22 Claims, 10 Drawing Sheets

(51) Int. Cl.
*B60T 13/14* (2006.01)
*B60T 13/68* (2006.01)
*B60T 13/74* (2006.01)
*B60T 15/02* (2006.01)
*B60T 17/22* (2006.01)

(52) U.S. Cl.
CPC .......... *B60T 13/686* (2013.01); *B60T 15/028* (2013.01); *B60T 17/221* (2013.01); *B60T 2220/04* (2013.01); *B60T 2270/402* (2013.01); *B60T 2270/403* (2013.01); *B60T 2270/404* (2013.01); *B60T 2270/82* (2013.01); *B60T 2270/88* (2013.01)

(56) References Cited

U.S. PATENT DOCUMENTS

| | | | |
|---|---|---|---|
| 2008/0251335 A1* | 10/2008 | Reiner | B60T 8/368 |
| | | | 188/358 |
| 2012/0153752 A1* | 6/2012 | Haas | H01H 50/10 |
| | | | 310/72 |
| 2015/0336554 A1* | 11/2015 | Vogel | H02K 5/1672 |
| | | | 310/91 |
| 2019/0031165 A1 | 1/2019 | Besier et al. | |
| 2019/0100172 A1* | 4/2019 | Lee | B60T 7/042 |
| 2019/0248348 A1* | 8/2019 | Ganzel | B60T 13/745 |
| 2019/0308601 A1* | 10/2019 | Maj | B60T 13/161 |
| 2020/0047731 A1* | 2/2020 | Reuter | B60T 13/146 |
| 2020/0276963 A1* | 9/2020 | Zimmermann | B60T 13/686 |
| 2022/0203950 A1* | 6/2022 | Hong | B60T 13/686 |
| 2023/0048099 A1* | 2/2023 | Weh | B60T 8/409 |

\* cited by examiner

POWER TRANSMISSION UNIT AND BRAKE SYSTEMS USING SAME

TECHNICAL FIELD

This disclosure relates to a power transmission unit and, more particularly, to a brake system for hydraulically actuating two pairs of brakes using the power transmission unit in a hydraulic brake by wire system.

BACKGROUND

A brake system may include a plurality of wheel brakes and a hydraulic braking pressure generator, a braking pressure modulator which is provided in the pressure fluid conduits between the braking pressure generator and the wheel brakes and which serves to vary the braking pressure by changing the volume of a chamber containing the hydraulic fluid, sensors for determining the wheel rotational behavior, and electronic circuits for processing the sensor signals and for generating braking-pressure control signals. Brake systems may also include an electronic control unit that can be used to provide a braking command to the wheel brakes, autonomously and/or manually (e.g., via the use of an operator-manipulable brake pedal).

SUMMARY

In an aspect, a power transmission unit of a single-acting plunger type is disclosed. The power transmission unit includes a ball screw, a ball nut selectively driven by the ball screw for longitudinal motion relative thereto, and a plunger piston operatively coupled to the ball nut. A block housing at least partially encloses the plunger piston and the ball screw. A plunger chamber is at least partially defined by the block housing and a face of the plunger piston. The plunger chamber is configured to contain hydraulic fluid and is selectively pressurized by reciprocal motion of the plunger piston with respect to the block housing driven by longitudinal motion of the ball nut. An output channel selectively places the plunger chamber in fluid communication with at least one component of a brake system including the power transmission unit. An electric motor selectively drives the ball screw to responsively reciprocate the plunger piston within the plunger chamber. A motor housing at least partially encloses the ball nut, the electric motor, and the plunger piston. The motor housing includes a block lip which is crimped to the block housing to maintain the motor housing in relation to the block housing.

BRIEF DESCRIPTION OF THE DRAWINGS

For a better understanding, reference may be made to the accompanying drawings, in which.

DESCRIPTION OF ASPECTS OF THE DISCLOSURE

Unless defined otherwise, all technical and scientific terms used herein have the same meaning as is commonly understood by one of ordinary skill in the art to which the present disclosure pertains.

The invention comprises, consists of, or consists essentially of the following features, in any combination.

Figure 1:
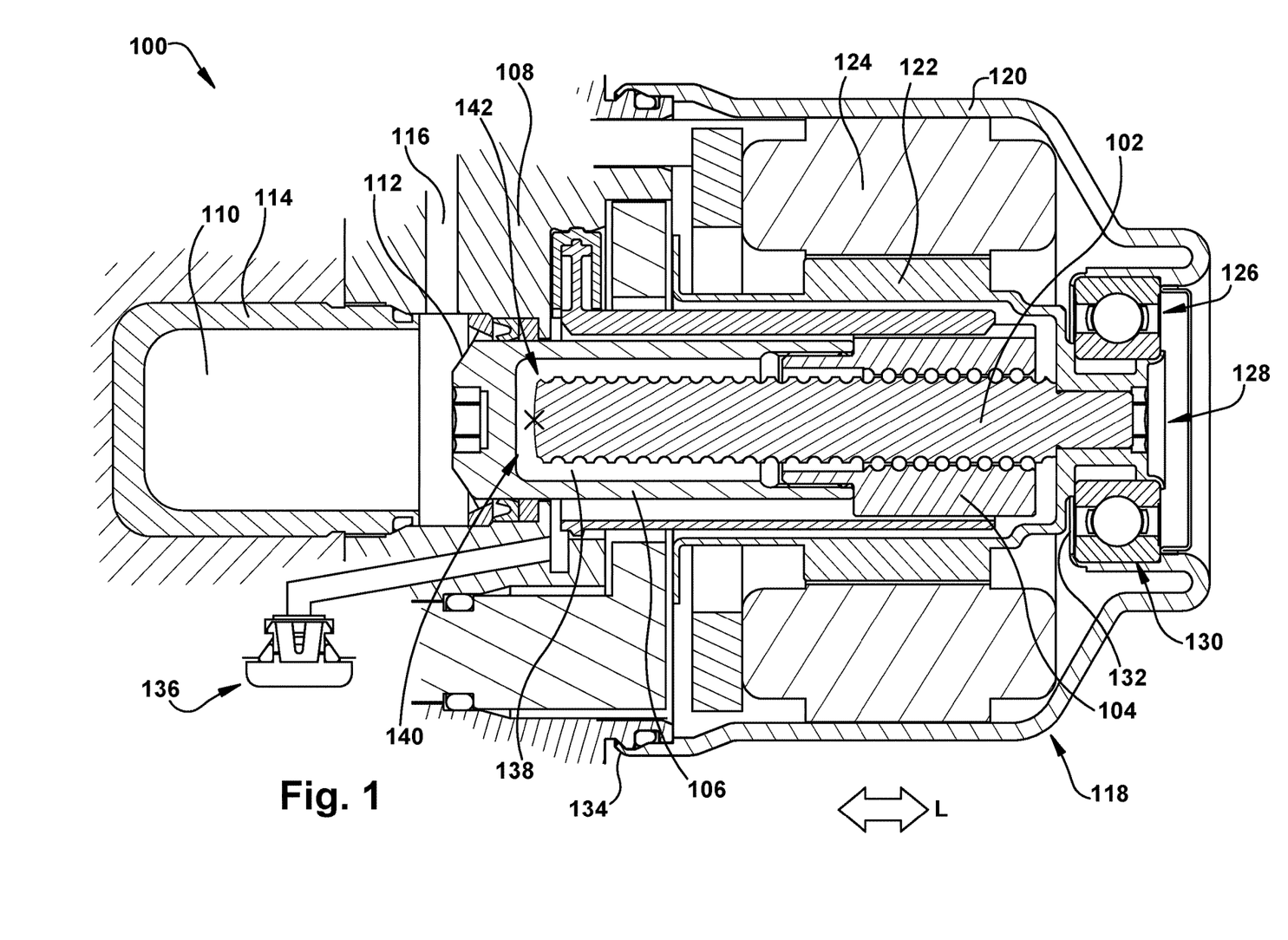
FIG. 1 is a schematic cross-sectional view of a component of a brake system according to an aspect of the present invention, in a first example configuration.
Figure 2:
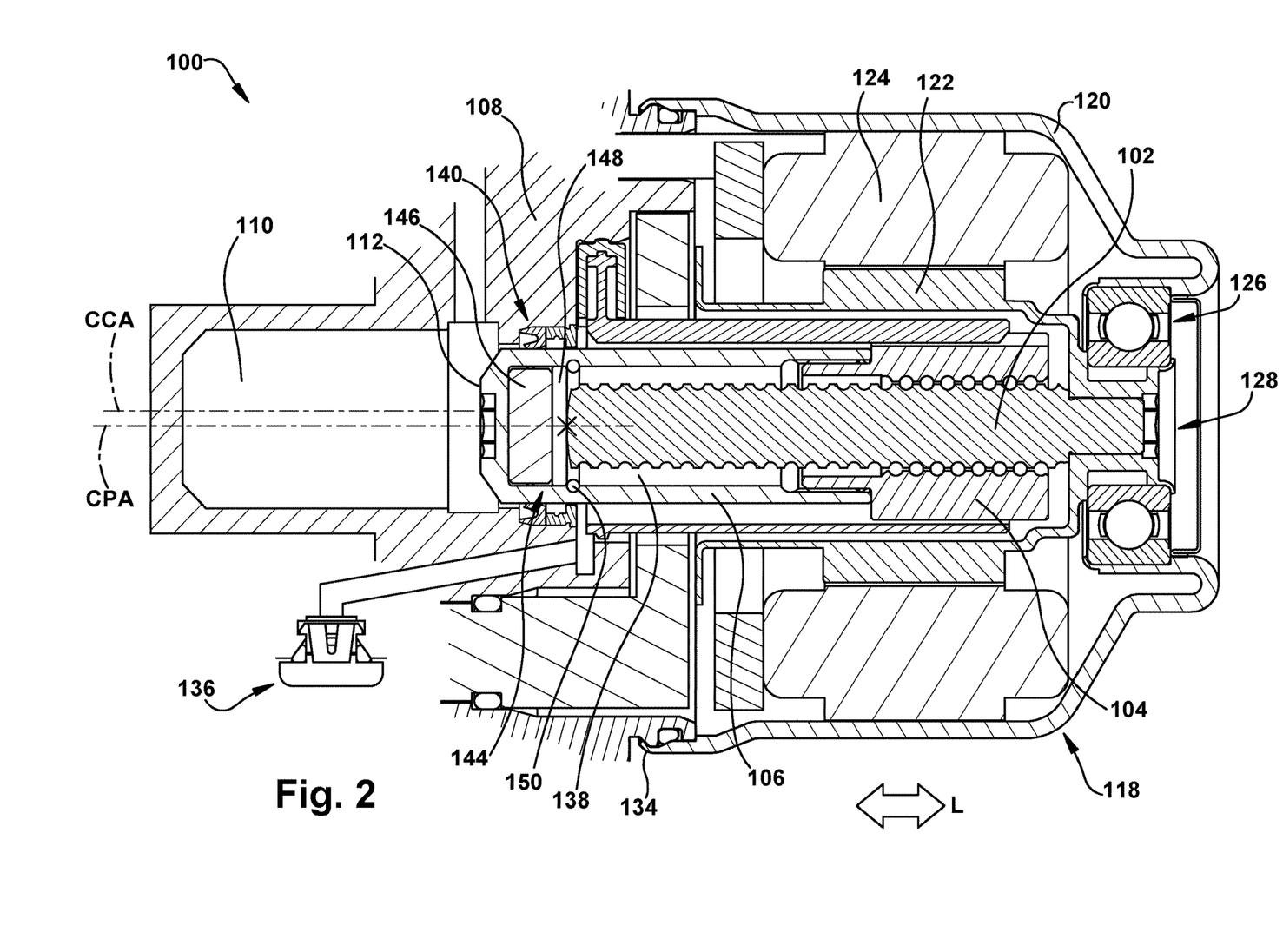
FIG. 2 is a schematic cross-sectional view of the component of FIG. 1, in a second example configuration.

FIGS. 1-2 depict a power transmission unit 100 of a single-acting plunger type. The power transmission unit 100 includes a ball screw 102 and a ball nut 104 selectively driven by the ball screw 102 for longitudinal motion relative thereto. The "longitudinal" direction, as referenced herein, is shown by arrow "L" and is substantially horizontal, in the orientation of FIGS. 1-2.

A plunger piston 106 is operatively coupled to the ball nut 104 for relative longitudinal movement therewith responsive to rotational movement, about the longitudinal direction, by the ball screw 102. A block housing 108 at least partially encloses the plunger piston 106 and the ball screw 102. A plunger chamber 110 is at least partially defined by the block housing 108 and a face 112 of the plunger piston 106. The plunger chamber 110 is configured to contain hydraulic fluid and is selectively pressurized by reciprocal motion of the plunger piston 106 with respect to the block housing 108, driven by longitudinal motion of the ball nut 104. It is noted that the plunger piston 106 is shown in FIGS. 1-2 as being in a "home" or fully-retracted "rest" position, in which the plunger piston 106 is not exerting pressure on fluid within the plunger chamber. It is contemplated that an end cap 114 could be provided as a "liner" or otherwise to assist with maintaining a substantially fluidtight condition of the plunger chamber 110, as desired.

An output channel 116 selectively places the plunger chamber 110 in fluid communication with at least one component of a brake system including the power transmission unit 100. Pressurized hydraulic fluid is generated within the plunger chamber 110 and flows outward through the output channel 116 for providing actuating/motive pressure to components of any brake system, as desired, which includes the power transmission unit 100. One of ordinary skill in the art will be readily able to configure a hydraulic brake system to use the power transmission unit 100 disclosed herein, particularly when a single-acting plunger type power transmission unit is desired for that specific hydraulic brake system.

An electric motor 118 is provided for selectively driving the ball screw 102 to responsively reciprocate the plunger piston 106 within the plunger chamber 110. A motor housing 120 at least partially encloses the ball nut 104, the electric motor 118, and/or the plunger piston 106. The electric motor 118 includes a motor rotor 122 operatively coupled to the ball screw 102 for rotation therewith, and a motor stator 124 mounted on the motor housing 120 and stationary relative thereto. Torque developed by the motor stator 124 is resisted and/or "dissipated" by at least a portion of the motor housing 120.

A bearing 126 is provided for rotatably supporting a supported end 128 of the ball screw 102, the supported end 128 being longitudinally spaced apart from the plunger chamber 110. The motor housing 120 includes a bearing recess 130 with a bearing lip 132 crimped onto at least a portion of the bearing 126 to maintain the bearing 126 relatively stationary in relation to the motor housing 120, as well as to selectively transmit or "dissipate" force from the bearing 126 into the motor housing 120. The crimping of the bearing lip 132 onto the motor housing can be accomplished via a plurality of discrete crimp locations spaced about a periphery of the bearing lip 132, or can be done about substantially an entire circumferential extent of the bearing lip 132. Particularly in the latter case, forces between the bearing 126 and the motor housing 120 can be transmitted efficiently and without unevenly spread local stress concentrations as might be developed in the prior art bolted arrangements for similar components.

The motor housing 120 may include a block lip 134 which is crimped to the block housing 108 to maintain the motor housing 120 in relation to the block housing 108. Because the power transmission unit 100 only builds pressure in one direction (i.e., is a "single-acting" plunger type unit), a "can" type motor housing 120 may be used, and the pressure-application direction will tend to reinforce or pull on the block lip 134 crimping arrangement, thus beneficially further seating the joint. If dual-direction pressure were to be present in the power transmission unit 100, the block lip 134 crimping arrangement could undergo undesirable reverse-direction force which might tend to degrade the joint between the block lip 134 and the block housing 108 and/or provide a high-stress concentration adjacent the motor bearing area of the housing.

For similar reasons to those discussed above with respect to the bearing lip 132, use of the block lip 134 instead of a plurality of bolts, spot-welds, or other point-contact fasteners may assist with distributing force evenly about the circumference of the motor housing 120. Additionally, for both the block lip 134 and bearing lip 132 crimped arrangements, use of the crimped-circumference scheme (or crimped-perimeter, when the components are not circular or curvilinear) can help with space arrangement considerations inside the power transmission unit and with respect to neighbouring structures, by eliminating the need for space for the bolts (or other point-contact fasteners) and space to allow for bolt manipulation. It is contemplated that welding, adhesives, fasteners, or any other suitable connection scheme or combination thereof could be used instead of, or in addition to, crimping, when desired.

The plunger chamber 110 (or the end cap 114, when present) may define a longitudinally extending central chamber axis ("CCA", in the Figures) which is laterally offset (i.e., non-coaxial) from a longitudinally extending central plunger axis ("CPA", in the Figures) of the plunger piston 106. The "lateral" direction is substantially perpendicular to the longitudinal direction, and is substantially vertical, in the orientation of FIGS. 1-2). Stated differently, the plunger chamber 110 and/or the end cap 114 is "off-center" from the plunger piston 106, as can be seen in FIG. 2. This offset placement may assist with providing desired flow of pressurized hydraulic fluid out of the power transmission unit 100, since the annular space around the extended piston 106 in the plunger chamber 110 will be wider/thicker on the side of the plunger chamber 110 which is adjacent the output channel 116. Such offset placement ma also minimize the outer diameter of the end cap 114 to help reduce overall package size, in some use environments.

A vent 136, optionally including a "gore membrane", may be provided in a known manner to assist with letting air or other gases vent from the plunger chamber 110. When present, the vent 136 can help keep at least liquid water out of the inside volume of the motor housing 120 (water vapor may be permitted to pass the vent 136 in some arrangements) and can also keep pressure near-atmospheric in the area of the power transmission unit 100 adjacent the electric motor 118.

The plunger piston 106 may define a longitudinal internal plunger cavity 138 for receiving at least a portion of the ball screw 102 thereinto, thus facilitating a smaller overall longitudinal dimension of the power transmission unit. The internal plunger cavity 138 may include a force dissipator 140 at a blind end thereof. The force dissipator 140 may be configured for selective contact with a cantilevered or free end 142 of the ball screw 102. When present, the force dissipator 140 may assist with absorbing and/or dissipating a longitudinally-directed force resulting from contact between the cantilevered end 142 of the ball screw with the inside (and especially the blind end) of the internal plunger cavity 138. For example, if there is a loss of power to the electric motor 118 or other relevant components of the brake system, the ball screw 102 may "free spin" in the ball nut 104 and return the attached plunger piston 106, potentially quite forcefully, to the "home" position shown in FIGS. 1-2 under influence of pressurized hydraulic fluid within the plunger chamber 110. (The plunger piston 106 could also or instead return to the "home", or fully retracted, position upon startup of the brake system, as desired.) Depending upon the tolerances and relative configurations of the components of the power transmission unit 100, the cantilevered end 142 of the ball screw 102 could "bang" longitudinally against the inside of the internal plunger cavity 138 (though a space therebetween is shown in FIG. 1), potentially causing unwanted forces and noise to develop within the power transmission unit 100. The force dissipator 140, when present, resists these unwanted effects of contact between the ball screw 102 and the plunger piston 106.

As shown schematically in FIGS. 1-2, the cantilevered end 142 of the ball screw 102 may include a slightly convex profile, configured to concentrate contact with the force dissipator 140 at a predetermined area of the convex profile (e.g., the area at/adjacent the marking asterisk, in FIGS. 1-2). Through such intentional force concentration, the force can be directed to, e.g., an intentionally hardened portion of the cantilevered end 142 of the ball screw 102. Accordingly, this near-point contact between the intentional force concentration may be helpful in providing less frictional torque for a predetermined axial force between the contacting components. If frictional torque is more than the motor 118 can overcome, then the ball screw 102 will be prevented from turning, thus "locking up" the power transmission unit 100 in an undesirable manner.

With specific reference now to FIG. 2, a configuration of the power transmission unit 100 is shown in which the force dissipator 140 includes a spring member 144. The spring member 144 could be a simple coil spring, Belleville washer, and/or any other suitable spring member, and can readily be provided for a particular use environment of the present invention by one of ordinary skill in the art. However, as shown in FIG. 2, the spring member 144 of the force dissipator 140 includes a resilient bumper 146. For example, a rubber puck or other suitable structure could be used as a resilient bumper 146.

The spring member 144 of the force dissipator 140 of FIG. 2 also may include a planar member 148 interposed longitudinally between the resilient bumper 146 and the cantilevered end 142 of the ball screw 102. The planar member 148 may be, for example, a steel plate in some use environments of the power transmission unit 100, and may assist both with protecting the resilient bumper 146 from erosion by repeated contact against the cantilevered end 142 of the ball screw 102 and with spreading force from the cantilevered end 142 about a wider area of the force dissipator 140 than just the portion thereof which contacts the predetermined area (asterisked in FIGS. 1-2). FIGS. 3-16 schematically depict the power transmission unit 100 of FIG. 1, for the sake of example, but one of ordinary skill in the art will understand that the power transmission unit 100 configured as shown in FIG. 2 could also or instead be used as desired.

Figure 3:
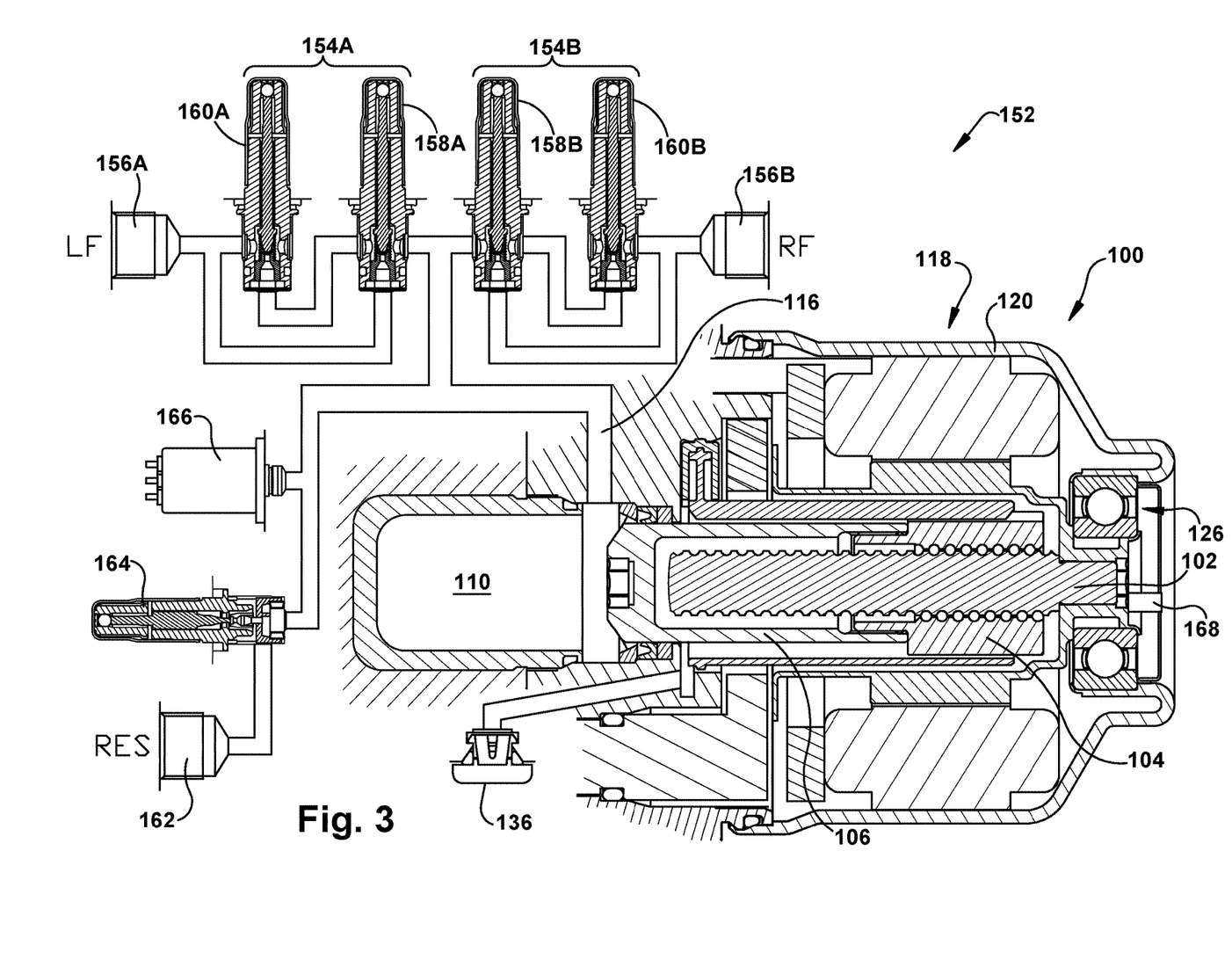
FIG. 3 is a schematic partial view of an example hydraulic brake by wire unit including the component of FIGS. 1-2.

Turning now to FIG. 3, a hydraulic brake by wire ("HBW") unit 152 is schematically depicted. The HBW unit 152 of FIG. 3 includes a power transmission unit 100 (which, again, could be configured as in either of FIGS. 1-2 or in any other desired manner). First and second multiplex control valve arrangements 154A, 154B are fluidly connected to the output channel 116 of the power transmission unit 100. Each of the first and second multiplex control valve arrangements 154A, 154B is interposed hydraulically between the power transmission unit 100 and a respective one of first and second iso tube ports 156A and 156B. The first and second iso tube ports 156A and 156B are configured for fluidic attachment to respective first and second wheel brakes (labeled here, by way of example, as left front and right front hydraulically actuated wheel brakes). The first and second iso tube ports 156A and 156B may be threaded, clipped, and/or swaged onto the channels connecting them with other components of the HBW unit 152, or formed in any other desired fashion. The first and second multiplex control valve arrangements 154A, 154B each include respective first and second iso-type valves 158 and 160. The HBW unit 152 could be configured for use in any suitable brake system, with an example brake system being discussed below and with reference to FIG. 16. Other nonlimiting examples, among myriad systems, of brake systems in which the HBW unit 152 could be suitably used (with the power transmission unit 100 described herein substituted for the power transmission unit shown in the referenced applications) are disclosed in U.S. patent application Ser. No. 17/366,715, filed 2 Jul. 2021 and titled "Apparatus and Method for Selectively Actuating Wheel Brakes of a Hydraulic Brake System"; U.S. patent application Ser. No. 17/400,210, filed concurrently herewith and titled "Fluid Separator and Brake Systems Using Same", hereafter referenced as "the Ser. No. 17/400,210 application"; and U.S. patent application Ser. No. 17/400,250, filed concurrently herewith and titled "Apparatus and Method for Control of a Hydraulic Brake System including Manual Pushthrough" all of which are incorporated herein by reference in their entirety.

A reservoir port 162 is fluidly connected to the output channel 116 of the power transmission unit 100 and is configured to selectively place the output channel 116 (and other components of the HBW unit 152) into fluid connection with a reservoir of the brake system. A venting valve 164 and a pressure sensor 166 may be fluidly connected to the output channel 116 of the power transmission unit 100.

Any desired type of position sensor (shown schematically at 168) is configured to produce a position signal indicative of a location of the plunger piston 106 relative to the plunger chamber 110 may be provided, such as, but not limited to, a Hall Effect sensor, an inductive sensor, a motor rotation counter, a time-of-flight sensor, any other desired sensor type, or any combination thereof. Regardless of the nature of the sensing scheme, the position sensor 168, when present, generates a position signal responsive to a sensed and/or calculated location of the plunger piston 106 with respect to the plunger chamber 110. The position sensor 168 may also be used to provide electronic commutation of the motor 118, especially when a brushless DC motor is used. An electronic control unit receives the position signal from the position sensor 168 and responsively controls fluid flow between the plunger chamber 110 and at least one of the first iso tube port 156A, the second iso tube port 156B, and the reservoir port 162. This control by the electronic control unit may be accomplished via manipulation of one or more of the iso valves 158, the iso valves 160, and the venting valve(s) 164 of the HBW unit 152.

FIG. 3 represents a schematic "diagram view" of the HBW unit 152. However, as one of ordinary skill in the art will be aware, components and fluid channels/lumens of an HBW unit 152 and/or a brake system may be collectively machined, molded, inserted, formed in, or otherwise provided to a common block housing 108, which often becomes quite internally complex and labyrinthine in order to accommodate the position, number, and size of multiple components in a compact manner. FIGS. 4-15 depict various configurations of HBW units 152 in a form which might be crafted for insertion into a vehicle (though these Figures, like all Figures of the present application, are not drawn to scale). Due to the difficulty in showing internal passages of a solid block, FIGS. 4-15 show the various ports, valves, channels, and other components of the HBW unit 152 as being "freestanding" structures, floating in space lightly and schematically delineated as being the block housing 108. One of ordinary skill in the art will realize, however, that the depicted "positive space" structures are often, in reality, likely going to be "negative space" voids within a block of material, which is omitted here for clarity.

FIGS. 4-9 depict various views of the HBW unit 152, showing that the first and second multiplex control valve arrangements 154A, 154B, the first and second iso tube ports 156A, 156B, the venting valve 164, and/or the pressure sensor 156 are collectively contained at least partially within the block housing 108 which also contains the power transmission unit 100. (Again, the block housing 108 is largely absent from FIGS. 4-9 for clarity, but one of ordinary skill in the art will understand the manner in which the block housing 108 encloses the depicted components).

Figures 4, 5:
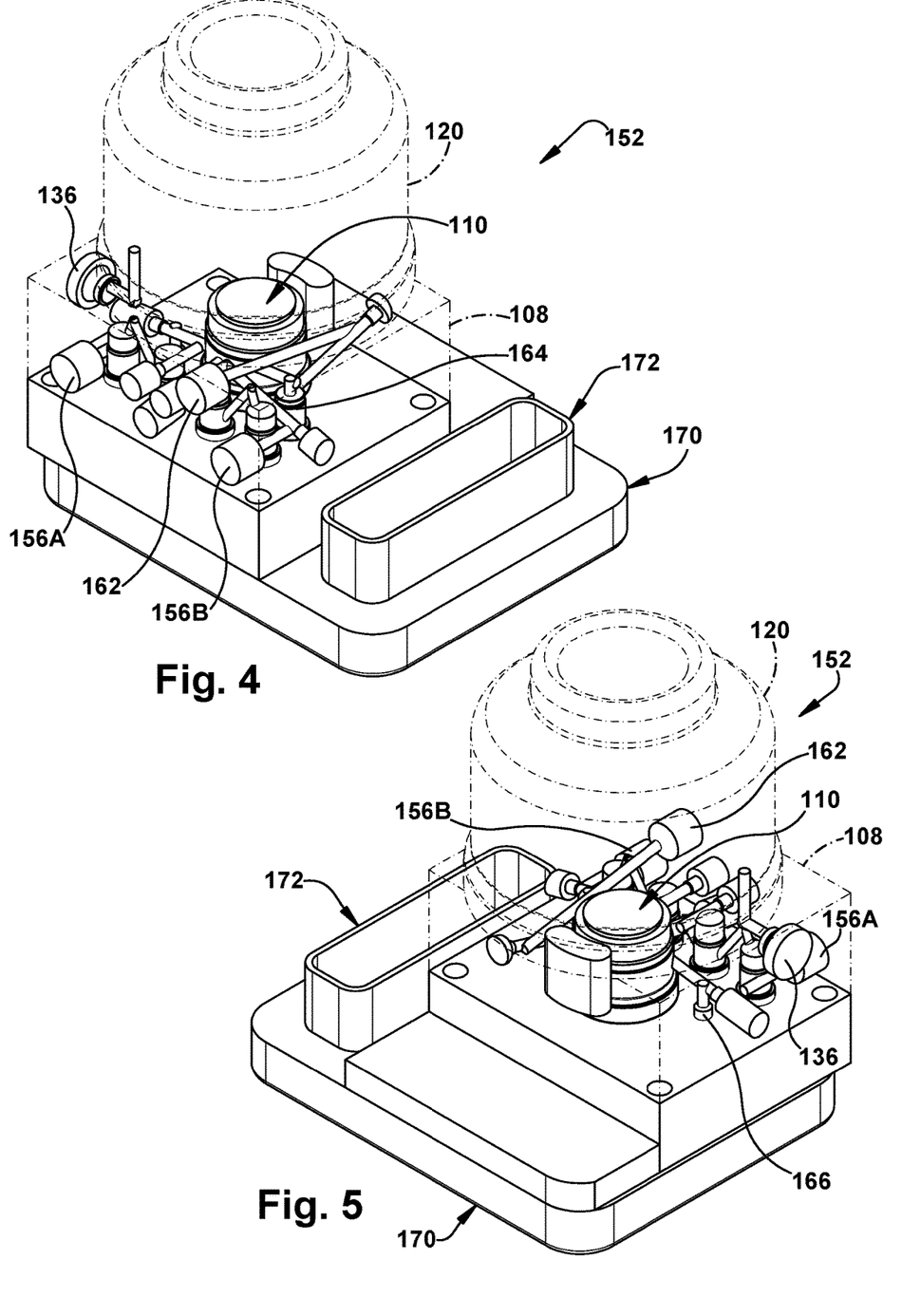
FIG. 4 is a schematic front perspective view of the hydraulic brake by wire unit of FIG. 3.
FIG. 5 is a schematic rear perspective view of the hydraulic brake by wire unit of FIG. 3.
Figure 6:
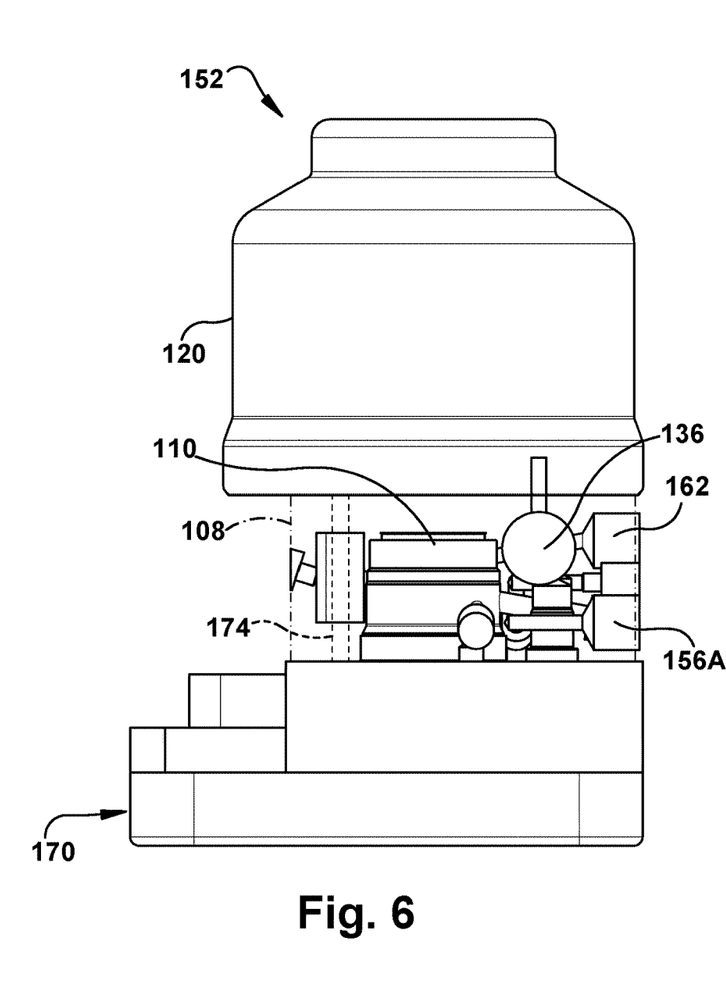
FIG. 6 is a schematic left side view of the hydraulic brake by wire unit of FIG. 3.
Figure 7:
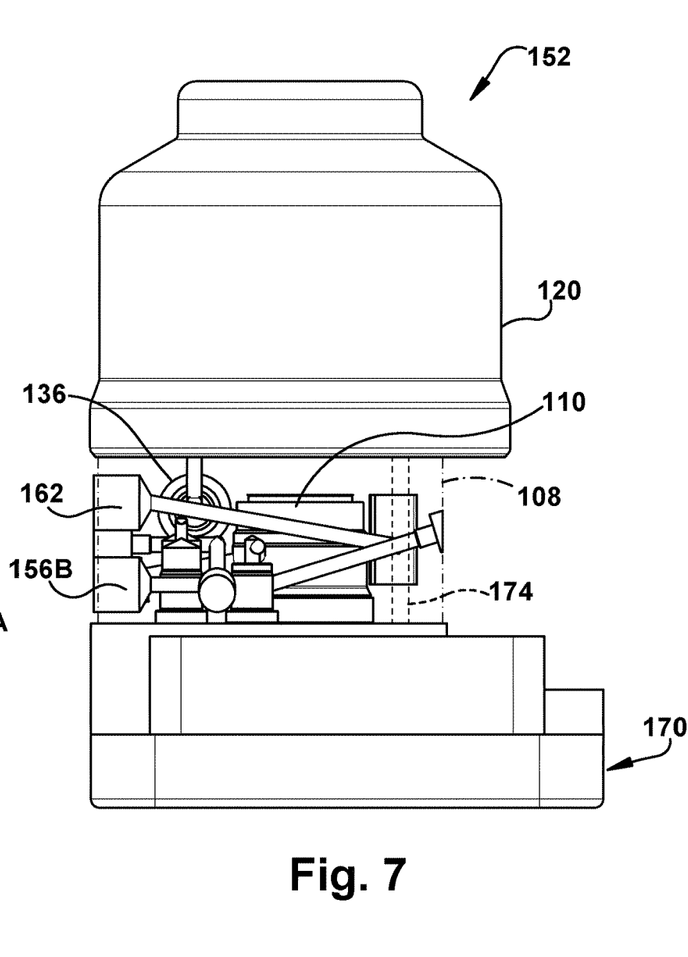
FIG. 7 is a schematic right side view of the hydraulic brake by wire unit of FIG. 3.
Figure 8:
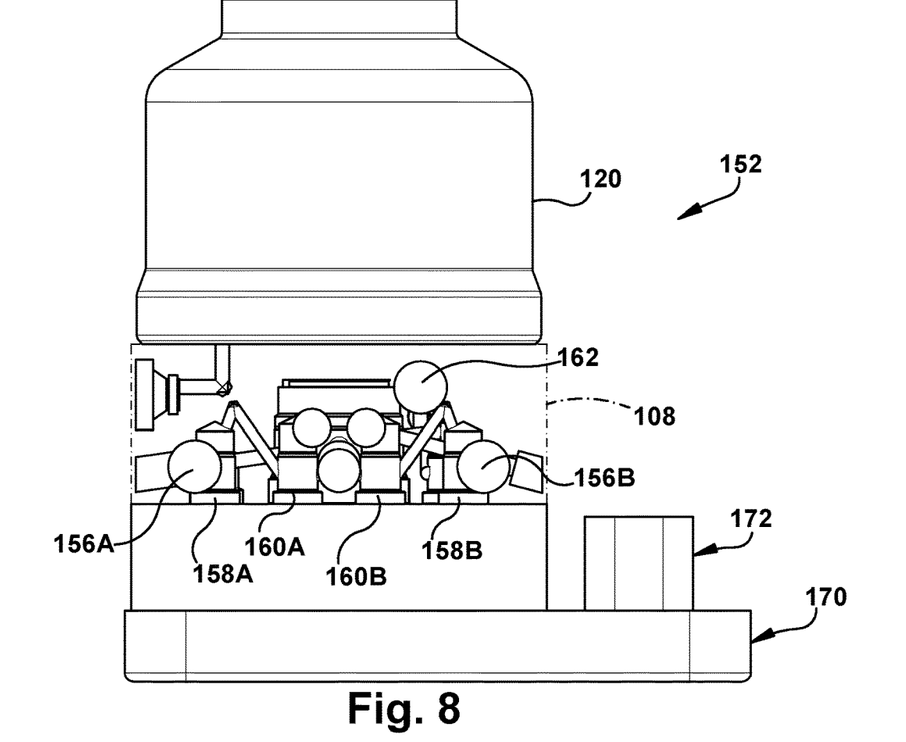
FIG. 8 is a schematic front view of the hydraulic brake by wire unit of FIG. 3.
Figure 9:
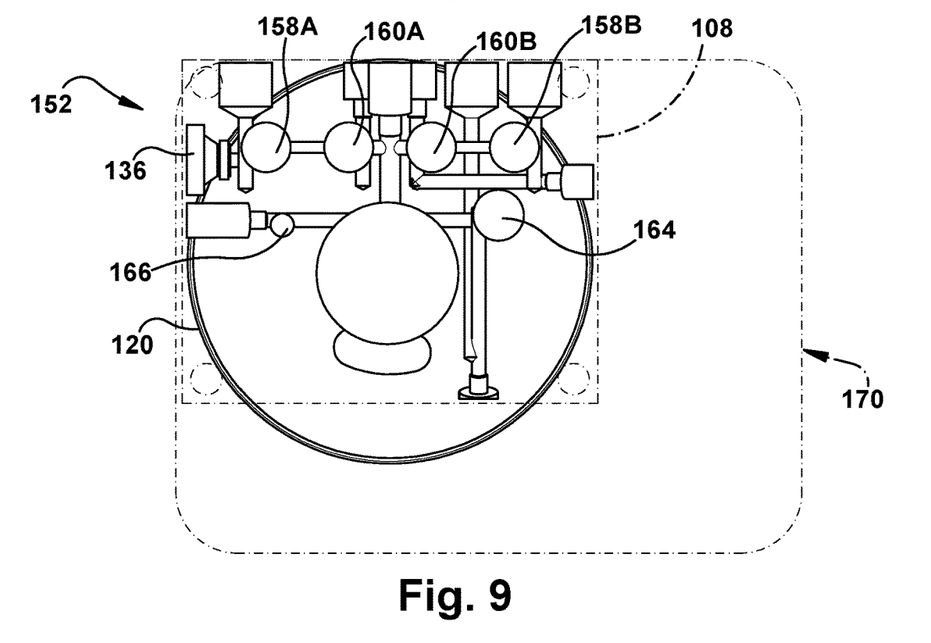
FIG. 9 is a schematic partial bottom view of the hydraulic brake by wire unit FIG. 3.
Figures 10, 11:
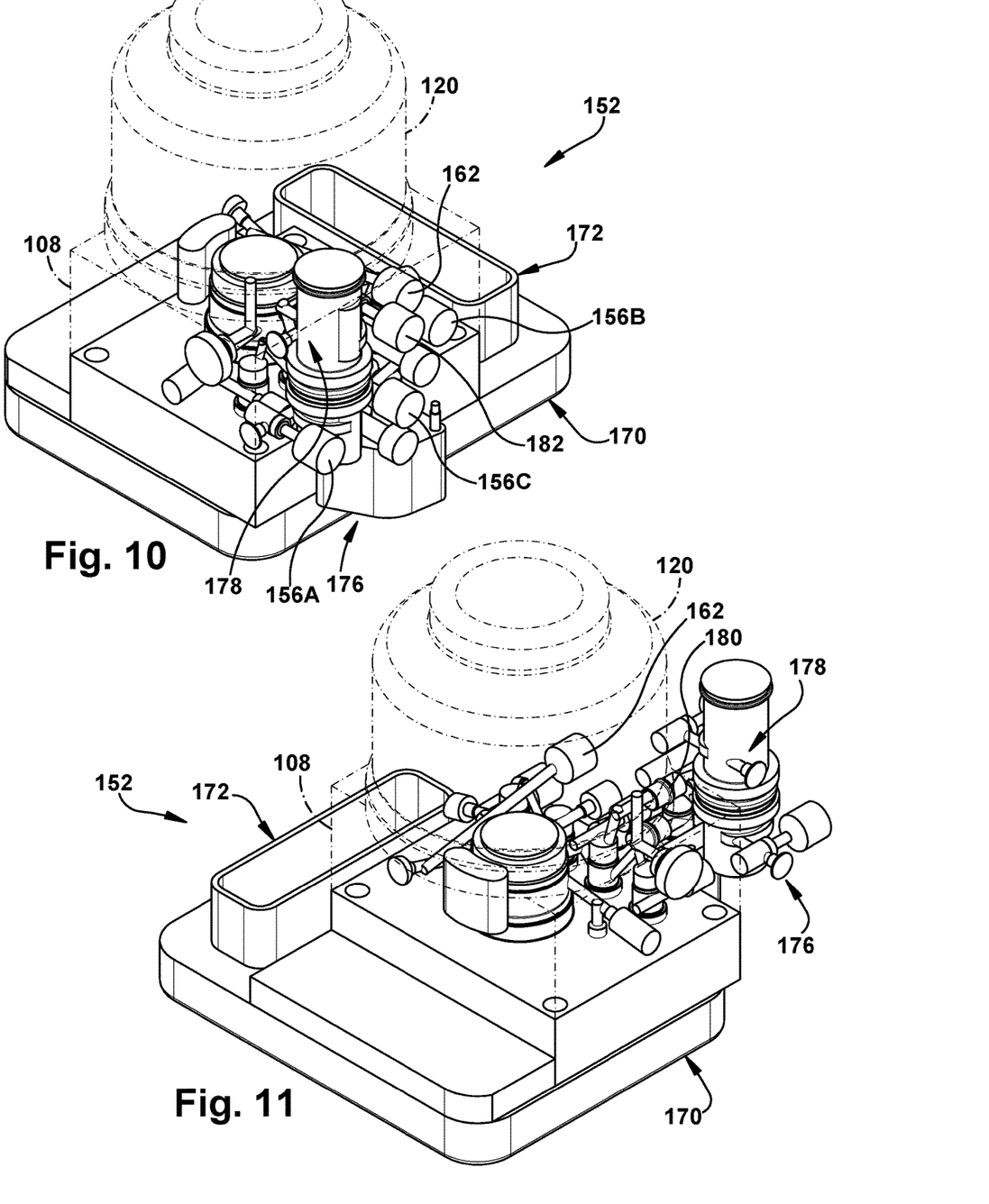
FIG. 10 is a schematic front perspective view of the hydraulic brake by wire unit of FIG. 3 in a first alternate configuration.
FIG. 11 is a schematic rear perspective view of the hydraulic brake by wire unit of FIG. 3 in the first alternate configuration.
Figure 12:
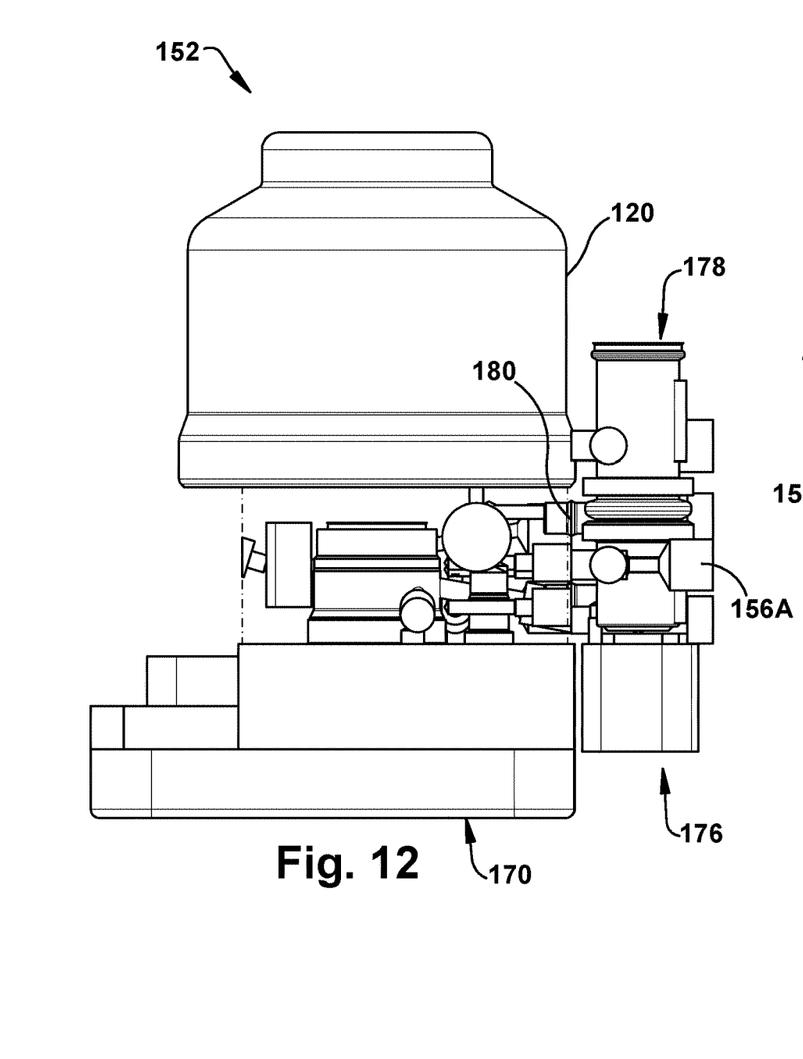
FIG. 12 is a schematic left side view of the hydraulic brake by wire unit of FIG. 3 in the first alternate configuration.
Figure 13:
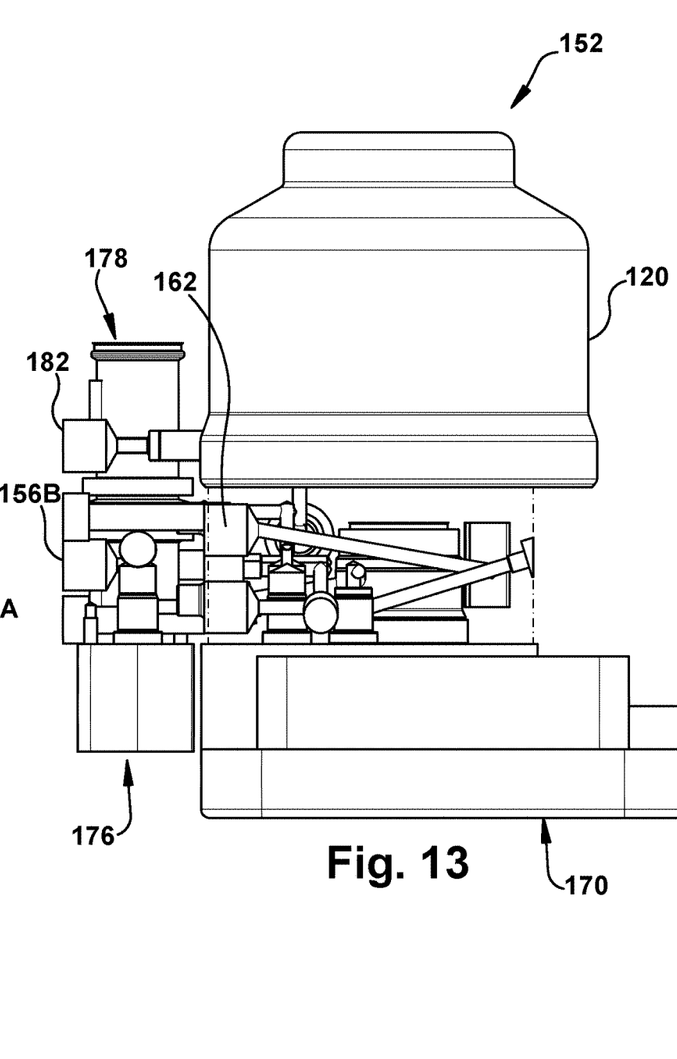
FIG. 13 is a schematic right side view of the hydraulic brake by wire unit of FIG. 3 in the first alternate configuration.
Figure 14:
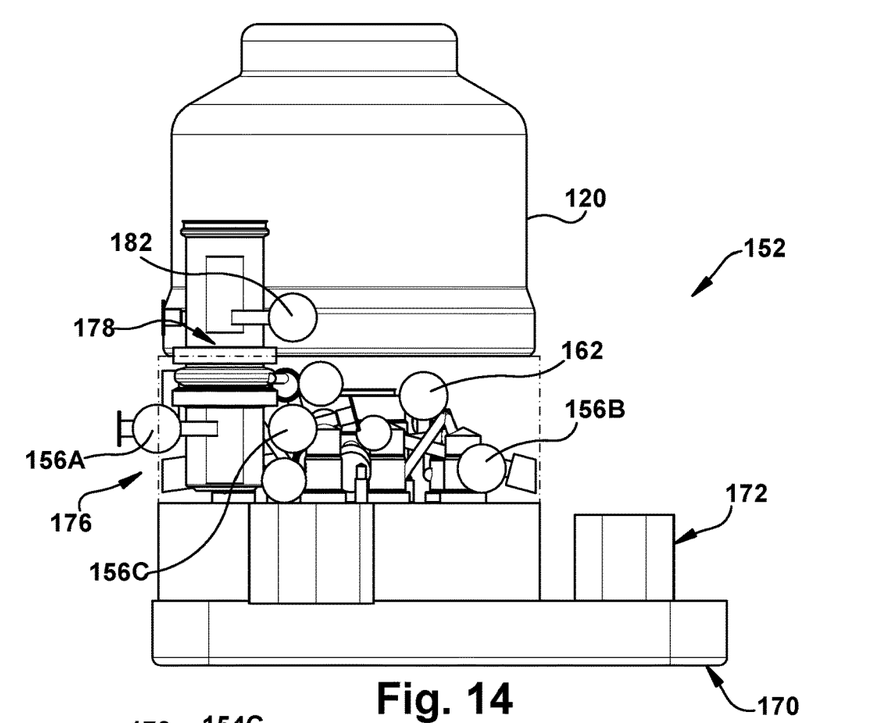
FIG. 14 is a schematic front view of the hydraulic brake by wire unit of FIG. 3 in a second alternate configuration.
Figure 15:
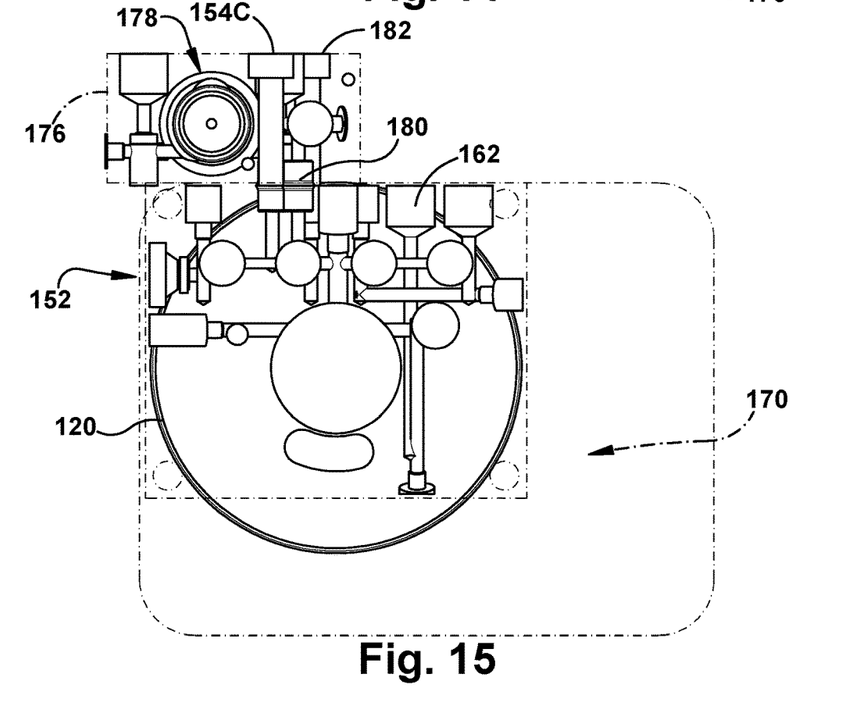
FIG. 15 is a schematic partial bottom view of the hydraulic brake by wire unit of FIG. 3 in the second alternate configuration.

As previously mentioned, the HBW unit 152 or components thereof may be in signal exchanging communication with an electronic control unit 170. The electronic control unit ("ECU") 170 may be configured for attachment to the block housing 108 at a location longitudinally opposite the block housing 108 from the motor housing 120, as shown in FIGS. 4-5. A connector 172 may be provided for routing signals and/or power to and from the ECU 170. The block housing may include at least one signal passageway (shown schematically at 174) configured for routing a signal wire between the ECU 170 and the electric motor 118 for passing at least one of electric power and control signals therebetween. It should be noted here that relative placement of the ECU 170, motor housing 120, connector 172, signal passageway 174, and other components of the HBW unit 152 may be of particular interest for certain use environments. For example, and as shown in it least FIGS. 4-9, certain components of the HBW unit 152 are spaced apart from the bottom of the unit (in the intended use orientation), to avoid locating them at/near a leakage pocket which could be present in the bottom of the unit. Additionally, placement of at least one signal passageway 174 adjacent the ECU connector 172 may be helpful, in some configurations of the HBW unit 152, for both power routing and power component placement on a circuit board associated with the ECU 170.

FIGS. 10-15 schematically depict an HBW unit 152 including an attached ECU 170, as well as an attached diagonal housing 176. As disclosed in the Ser. No. 17/400,210 application, a three-wheel failure mode brake system can be provided wherein a single power transmission unit 100 can hydraulically actuate two wheel brakes (e.g., via first and second iso tube ports 156A, 156B as mentioned above) during normal non-failure braking mode, as well as a third wheel brake in a backup braking mode via a fluid separator 178. Accordingly, the HBW unit 152 of FIGS. 10-15 could be used in a modular manner to provide one of the two pressure circuits in, for example, the embodiment depicted in FIG. 2 of the Ser. No. 17/400,210 application.

As shown in FIGS. 10-15, at least one jumper tube 180 could be used to attach the diagonal housing 176 to the HBW unit 152 when desired. (Certain components of the HBW unit 152 are left unlabeled in FIGS. 10-15 for clarity, and can be identified with reference to FIGS. 4-9.) An additional multiplex control valve arrangement (shown generally at 154C and discussed below) helps to control fluid flow through the fluid separator 178 to the "third" wheel brake via iso tube port 156C. As shown here, the HBW unit 152 directly controls the right front wheel brake via iso tube port 156A and the left rear wheel brake via iso tube port 156B, in the non-failure normal braking mode, and controls the left front wheel brake via iso tube port 156C in the backup braking mode. The fluid separator 178 also receives fluid from a second HBW unit via SAP port 182, as discussed at length in the Ser. No. 17/400,210 application.

Figure 16:
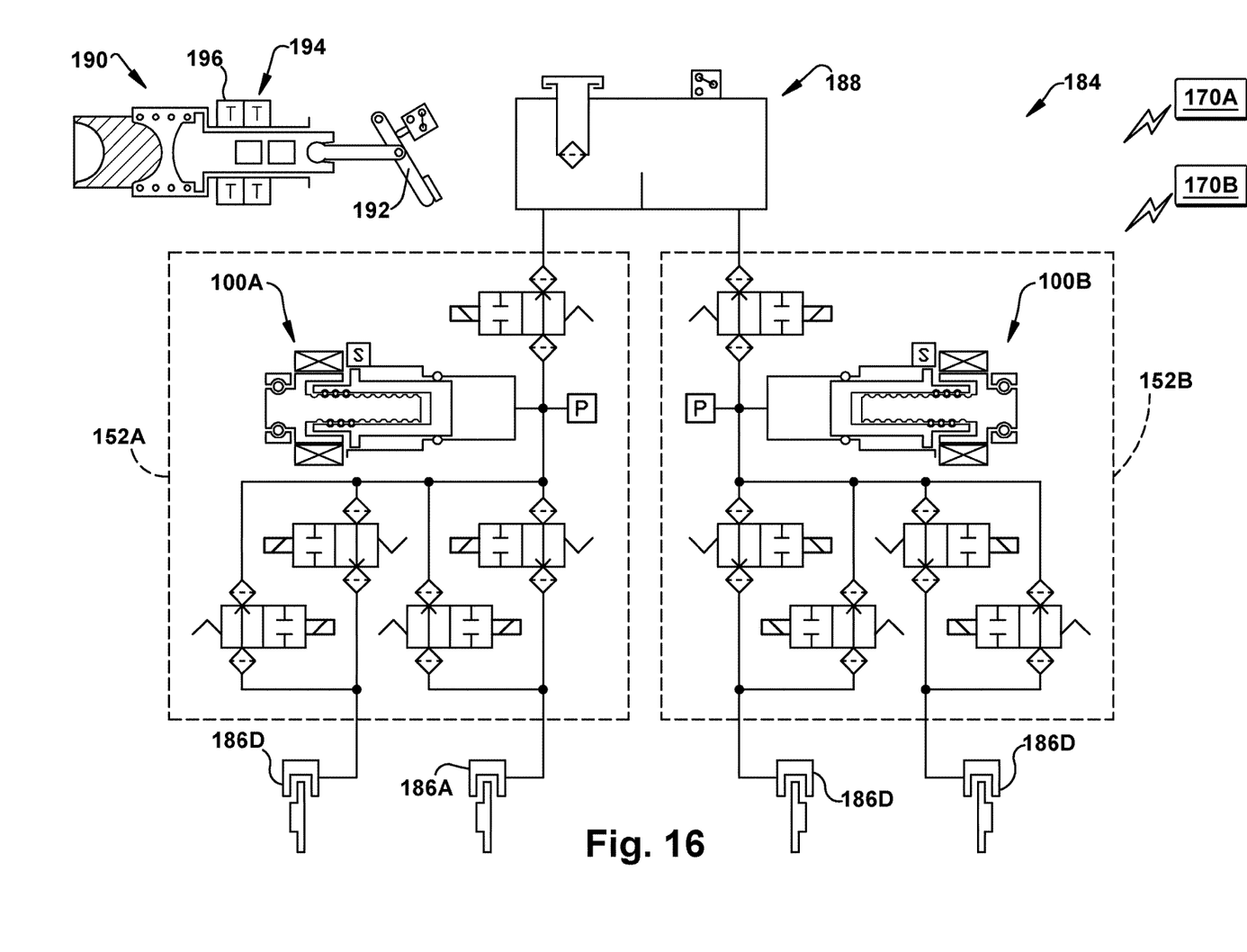
FIG. 16 is a schematic diagram of a brake system including the component of FIGS. 1-2.

FIG. 16 schematically depicts a brake system 184 for selectively actuating two pairs of hydraulically actuated wheel brakes 186 of a vehicle. The system includes a reservoir 188 and a first HBW unit 152A, which includes a first power transmission unit 100A. The reservoir port 162 of the first HBW unit 152A is in fluid communication with the reservoir 188, and the first and second iso tube ports 156A, 156B of the first HBW unit 152A are in fluid communication with respective wheel brakes 186 of a selected pair of hydraulically actuated wheel brakes 186A, 186D of the vehicle. The first HBW unit 152A is configured to selectively generate pressurized hydraulic fluid for actuating the selected pair of the hydraulically actuated wheel brakes 186A, 186D during a normal non-failure braking mode.

The brake system 184 also includes a second HBW unit 152B, which includes a second power transmission unit 100B. The reservoir port 162 of the second HBW unit 152B is in fluid communication with the reservoir 188, and the first and second iso tube ports 156A, 156B of the second HBW unit 152B are in fluid communication with respective wheel brakes 186 of an other pair of hydraulically actuated wheel brakes 186B, 186C of the vehicle (different than the selected pair). The second HBW unit 152B is configured to selectively generate pressurized hydraulic fluid for actuating the other pair of the hydraulically actuated wheel brakes 186B, 186C during a normal non-failure braking mode. At least one electronic control unit 170 of the brake system 184 (two shown, for redundancy) is configured to control at least one of the first and second power transmission units 100.

The brake system 184 also includes a deceleration signal transmitter 190 including a brake pedal 192 connected to a brake pedal unit 194 and selectively actuated by a driver of the vehicle to indicate a desired braking command. The brake pedal unit 194 has a brake sensor 196 for determining a position of the brake pedal 192 and responsively producing a braking signal corresponding to the desired braking command. The braking signal is transmitted to the at least one electronic control unit 170. The at least one electronic control unit 170 controls at least one of the first and second power transmission units 100A, 100B responsive to the braking signal.

Though omitted from FIG. 16, it is contemplated that at least a selected one of the first and second HBW units 152A, 152B may include a diagonal housing 176 like that shown in FIGS. 10-15. As mentioned with respect to those Figures, and referencing the Ser. No. 17/400,210 application, the diagonal housing 176 may include a fluid separator 178 and a third multiplex control valve arrangement 154C, which could include third and fourth iso-type valves in some use environments, but here is shown as being a single multiplex valve 154C providing a multiplex function when the brake system 184 is in a backup braking mode. The diagonal housing 176 may also include an iso tube port 156C and an SAP port 182 for connection to the power transmission unit 100 of the other one of the first and second HBW units 152A, 152B. The diagonal housing 176 may be configured for selective attachment to the block housing 108 of the selected one of the first and second HBW units 152A, 152B at a location spaced from the motor housing 120. The diagonal housing 176 may also be configured for selective fluid attachment to at least one connector tube (e.g., jumper tube 180) of the block housing 108 for fluid communication of at least the fluid separator 178, the third multiplex control valve arrangement 154C, and the iso tube port 156C with the output channel 116 of the selected one of the first and second HBW units 152A, 152B.

When present, the diagonal housing 176 may be associated with the selected one of the first and second HBW units 152A, 152B for selective control, in a backup braking mode, of at least one wheel brake 186 of the pair of wheel brakes which is opposite the wheel brake 185 in the pair of wheel brakes which is otherwise associated with the selected one of the first and second HBW units 152A, 152B for operation in a normal non-failure braking mode. That is, the backup braking control of at least one chosen wheel brake 186 is controlled/actuated by the opposite HBW unit 152 from that which controls/actuates the chosen wheel brake 186 for normal non-failure braking, similar to the scheme disclosed in the Ser. No. 17/400,210 application.

As used herein, the singular forms "a", "an", and "the" can include the plural forms as well, unless the context clearly indicates otherwise. It will be further understood that the terms "comprises" and/or "comprising", as used herein, can specify the presence of stated features, steps, operations, elements, and/or components, but do not preclude the presence or addition of one or more other features, steps, operations, elements, components, and/or groups thereof.

As used herein, the term "and/or" can include any and all combinations of one or more of the associated listed items.

It will be understood that when an element is referred to as being "on", "attached" to, "connected" to, "coupled" with, "contacting", "adjacent", etc., another element, it can be directly on, attached to, connected to, coupled with, contacting, or adjacent the other element, or intervening elements may also be present. In contrast, when an element is referred to as being, for example, "directly on", "directly attached" to, "directly connected" to, "directly coupled" with, "directly contacting", or "directly adjacent" another element, there are no intervening elements present. It will also be appreciated by those of ordinary skill in the art that references to a structure or feature that is disposed "directly adjacent" another feature may have portions that overlap or underlie the adjacent feature, whereas a structure or feature that is disposed "adjacent" another feature might not have portions that overlap or underlie the adjacent feature.

Spatially relative terms, such as "under", "below", "lower", "over", "upper", "proximal", "distal", and the like, may be used herein for ease of description to describe one element or feature's relationship to another element(s) or feature(s) as illustrated in the figures. It will be understood that the spatially relative terms can encompass different orientations of a device in use or operation, in addition to the orientation depicted in the figures. For example, if a device in the figures is inverted, elements described as "under" or "beneath" other elements or features would then be oriented "over" the other elements or features.

As used herein, the phrase "at least one of X and Y" can be interpreted to include X, Y, or a combination of X and Y. For example, if an element is described as having at least one of X and Y, the element may, at a particular time, include X, Y, or a combination of X and Y, the selection of which could vary from time to time. In contrast, the phrase "at least one of X" can be interpreted to include one or more Xs.

It will be understood that, although the terms "first", "second", etc. may be used herein to describe various elements, these elements should not be limited by these terms. These terms are only used to distinguish one element from another. Thus, a "first" element discussed below could also be termed a "second" element without departing from the teachings of the present disclosure. The sequence of operations (or steps) is not limited to the order presented in the claims or figures unless specifically indicated otherwise.

While aspects of this disclosure have been particularly shown and described with reference to the example aspects above, it will be understood by those of ordinary skill in the art that various additional aspects may be contemplated. For example, the specific methods described above for using the apparatus are merely illustrative; one of ordinary skill in the art could readily determine any number of tools, sequences of steps, or other means/options for placing the above-described apparatus, or components thereof, into positions substantively similar to those shown and described herein. In an effort to maintain clarity in the Figures, certain ones of duplicative components shown have not been specifically numbered, but one of ordinary skill in the art will realize, based upon the components that were numbered, the element numbers which should be associated with the unnumbered components; no differentiation between similar components is intended or implied solely by the presence or absence of an element number in the Figures. Any of the described structures and components could be integrally formed as a single unitary or monolithic piece or made up of separate sub-components, with either of these formations involving any suitable stock or bespoke components and/or any suitable material or combinations of materials. Any of the described structures and components could be disposable or reusable as desired for a particular use environment. Any component could be provided with a user-perceptible marking to indicate a material, configuration, at least one dimension, or the like pertaining to that component, the user-perceptible marking potentially aiding a user in selecting one component from an array of similar components for a particular use environment. A "predetermined" status may be determined at any time before the structures being manipulated actually reach that status, the "predetermination" being made as late as immediately before the structure achieves the predetermined status. The term "substantially" is used herein to indicate a quality that is largely, but not necessarily wholly, that which is specified—a "substantial" quality admits of the potential for some relatively minor inclusion of a non-quality item. Though certain components described herein are shown as having specific geometric shapes, all structures of this disclosure may have any suitable shapes, sizes, configurations, relative relationships, cross-sectional areas, or any other physical characteristics as desirable for a particular application. Any structures or features described with reference to one aspect or configuration could be provided, singly or in combination with other structures or features, to any other aspect or configuration, as it would be impractical to describe each of the aspects and configurations discussed herein as having all of the options discussed with respect to all of the other aspects and configurations. A device or method incorporating any of these features should be understood to fall under the scope of this disclosure as determined based upon the claims below and any equivalents thereof.

Other aspects, objects, and advantages can be obtained from a study of the drawings, the disclosure, and the appended claims.

I claim:

1. A power transmission unit of a single-acting plunger type, the power transmission unit comprising:
   a ball screw;
   a ball nut selectively driven by the ball screw for longitudinal motion relative thereto;
   a plunger piston operatively coupled to the ball nut;
   a block housing at least partially enclosing the plunger piston and the ball screw;
   a plunger chamber at least partially defined by the block housing and a face of the plunger piston, the plunger chamber being configured to contain hydraulic fluid and selectively pressurized by reciprocal motion of the plunger piston with respect to the block housing driven by longitudinal motion of the ball nut;
   an output channel selectively placing the plunger chamber in fluid communication with at least one component of a brake system including the power transmission unit;
   an electric motor for selectively driving the ball screw to responsively reciprocate the plunger piston within the plunger chamber;
   a motor housing at least partially enclosing the ball nut, the electric motor, and the plunger piston, the motor housing including a block lip which is crimped to the block housing to maintain the motor housing in relation to the block housing; and a bearing for rotatably supporting a supported end of the ball screw spaced apart from the plunger chamber, wherein the motor housing includes a bearing recess with a bearing lip crimped onto at least a portion of the bearing to maintain the bearing in relation to the motor housing.

2. The power transmission unit of claim 1, wherein the plunger chamber defines a longitudinally extending central chamber axis which is laterally offset from a longitudinally extending central plunger axis of the plunger piston.

3. The power transmission unit of claim 1, wherein the electric motor includes a motor rotor operatively coupled to the ball screw and a motor stator mounted on the motor housing wherein torque developed by the motor stator is resisted by at least a portion of the motor housing.

4. A hydraulic brake by wire unit, comprising:
the power transmission unit of claim 1;
first and second multiplex control valve arrangements fluidly connected to the output channel of the power transmission unit, each of the first and second multiplex control valve arrangements being interposed hydraulically between the power transmission unit and a respective one of first and second iso tube ports, the first and second multiplex control valve arrangements each including respective first and second iso-type valves.

5. The hydraulic brake by wire unit of claim 4, including a reservoir port fluidly connected to the output channel of the power transmission unit.

6. The hydraulic brake by wire unit of claim 4, wherein the first and second multiplex control valve arrangements and the first and second iso tube ports are collectively contained at least partially within the block housing of the power transmission unit.

7. The hydraulic brake by wire unit of claim 4, including a venting valve and a pressure sensor fluidly connected to the output channel of the power transmission unit.

8. The hydraulic brake by wire unit of claim 7, wherein the first and second multiplex control valve arrangements, the first and second iso tube ports, the venting valve, and the pressure sensor are collectively contained at least partially within the block housing of the power transmission unit.

9. The hydraulic brake by wire unit of claim 4, including an electronic control unit configured for attachment to the block housing at a location longitudinally opposite the block housing from the motor housing, wherein the block housing includes at least one signal passageway configured for routing a signal wire between the electronic control unit and the electric motor for passing at least one of electric power and control signals therebetween.

10. The hydraulic brake by wire unit of claim 4, including a position sensor configured to produce a position signal indicative of a location of the plunger piston relative to the plunger chamber.

11. The hydraulic brake by wire unit of claim 10, wherein the position sensor generates a position signal responsive to a sensed location of the plunger piston with respect to the plunger chamber, and the electronic control unit receives the position signal from the position sensor and responsively controls fluid flow between the plunger chamber and at least one of the first iso tube port, the second iso tube port, and the reservoir port.

12. A brake system for selectively actuating two pairs of hydraulically actuated wheel brakes of a vehicle, the system comprising:
a reservoir;
a first hydraulic brake by wire unit of claim 4, with the reservoir port of the first hydraulic brake by wire unit being in fluid communication with the reservoir and the first and second iso tube ports of the first hydraulic brake by wire unit being in fluid communication with respective wheel brakes of a selected pair of hydraulically actuated wheel brakes of the vehicle, the first hydraulic brake by wire unit being configured to selectively generate pressurized hydraulic fluid for actuating the selected pair of the hydraulically actuated wheel brakes during a normal non-failure braking mode;
a second hydraulic brake by wire unit of claim 10, with the reservoir port of the second hydraulic brake by wire unit being in fluid communication with the reservoir and the first and second iso tube ports of the second hydraulic brake by wire unit being in fluid communication with respective wheel brakes of an other pair of hydraulically actuated wheel brakes of the vehicle, the second hydraulic brake by wire unit being configured to selectively generate pressurized hydraulic fluid for actuating the other pair of the hydraulically actuated wheel brakes during a normal non-failure braking mode; and
at least one electronic control unit configured to control at least one of the first and second power transmission units.

13. The brake system of claim 12, including a deceleration signal transmitter including a brake pedal connected to a brake pedal unit and selectively actuated by a driver of the vehicle to indicate a desired braking command, the brake pedal unit having a brake sensor for determining a position of the brake pedal and responsively producing a braking signal corresponding to the desired braking command, the braking signal being transmitted to the at least one electronic control unit, and the at least one electronic control unit controlling at least one of the first and second power transmission units responsive to the braking signal.

14. The brake system of claim 12, wherein at least a selected one of the first and second hydraulic brake by wire units includes a diagonal housing, the diagonal housing including
a fluid separator,
a third multiplex control valve arrangement including at least one multiplex valve,
an iso tube port; and
an SAP port for connection to the power transmission unit of the other one of the first and second hydraulic brake by wire units,
the diagonal housing being configured for selective attachment to the block housing at a location spaced from the motor housing and selective fluid attachment to a connector tube of the block housing for fluid communication of at least the fluid separator, the third multiplex control valve arrangement, and the iso tube port with the output channel;
wherein the diagonal housing is associated with the selected one of the first and second hydraulic brake by wire units for selective control, in a backup braking mode, of at least one wheel brake of the pair of wheel brakes which is opposite the wheel brake in the pair of wheel brakes which is otherwise associated with the selected one of the first and second hydraulic brake by wire units for operation in a normal non-failure braking mode.

15. A power transmission unit of a single-acting plunger type, the power transmission unit comprising:
a ball screw;
a ball nut selectively driven by the ball screw for longitudinal motion relative thereto;

a plunger piston operatively coupled to the ball nut;
a block housing at least partially enclosing the plunger piston and the ball screw;
a plunger chamber at least partially defined by the block housing and a face of the plunger piston, the plunger chamber being configured to contain hydraulic fluid and selectively pressurized by reciprocal motion of the plunger piston with respect to the block housing driven by longitudinal motion of the ball nut;
an output channel selectively placing the plunger chamber in fluid communication with at least one component of a brake system including the power transmission unit;
an electric motor for selectively driving the ball screw to responsively reciprocate the plunger piston within the plunger chamber; and
a motor housing at least partially enclosing the ball nut, the electric motor, and the plunger piston, the motor housing including a block lip which is crimped to the block housing to maintain the motor housing in relation to the block housing;
the plunger piston defines defining a longitudinal internal plunger cavity for receiving at least a portion of the ball screw, the internal plunger cavity including a force dissipator at a blind end thereof, the force dissipator being configured for selective contact with a cantilevered end of the ball screw.

16. The power transmission unit of claim 15, wherein the force dissipator includes a spring member.

17. The power transmission unit of claim 15, wherein the force dissipator includes a resilient bumper.

18. The power transmission unit of claim 17, wherein the force dissipator includes a planar member interposed longitudinally between the resilient bumper and the cantilevered end of the ball screw.

19. The power transmission unit of claim 15, wherein the cantilevered end of the ball screw includes a convex profile configured to concentrate contact with the force dissipator at a predetermined area of the convex profile.

20. The power transmission unit of claim 15, wherein the plunger chamber defines a longitudinally extending central chamber axis which is laterally offset from a longitudinally extending central plunger axis of the plunger piston.

21. The power transmission unit of claim 15, wherein the electric motor includes a motor rotor operatively coupled to the ball screw and a motor stator mounted on the motor housing wherein torque developed by the motor stator is resisted by at least a portion of the motor housing.

22. A hydraulic brake by wire unit, comprising the power transmission unit of claim 15; first and second multiplex control valve arrangements fluidly connected to the output channel of the power transmission unit, each of the first and second multiplex control valve arrangements being interposed hydraulically between the power transmission unit and a respective one of first and second iso tube ports, the first and second multiplex control valve arrangements each including respective first and second iso-type valves.

* * * * *

UNITED STATES PATENT AND TRADEMARK OFFICE
CERTIFICATE OF CORRECTION

PATENT NO. : 12,403,879 B2
APPLICATION NO. : 17/400326
DATED : September 2, 2025
INVENTOR(S) : Blaise J. Ganzel It is certified that error appears in the above-identified patent and that said Letters Patent is hereby corrected as shown below:

In the Claims

Column 12, Line 10, Claim 12, the word claim 10 should be corrected to claim 4

Signed and Sealed this
Twenty-first Day of October, 2025

John A. Squires
*Director of the United States Patent and Trademark Office*